March 31, 1942. E. W. FLOSDORF ET AL 2,278,195
VACUUM GAUGE
Filed Sept. 16, 1939
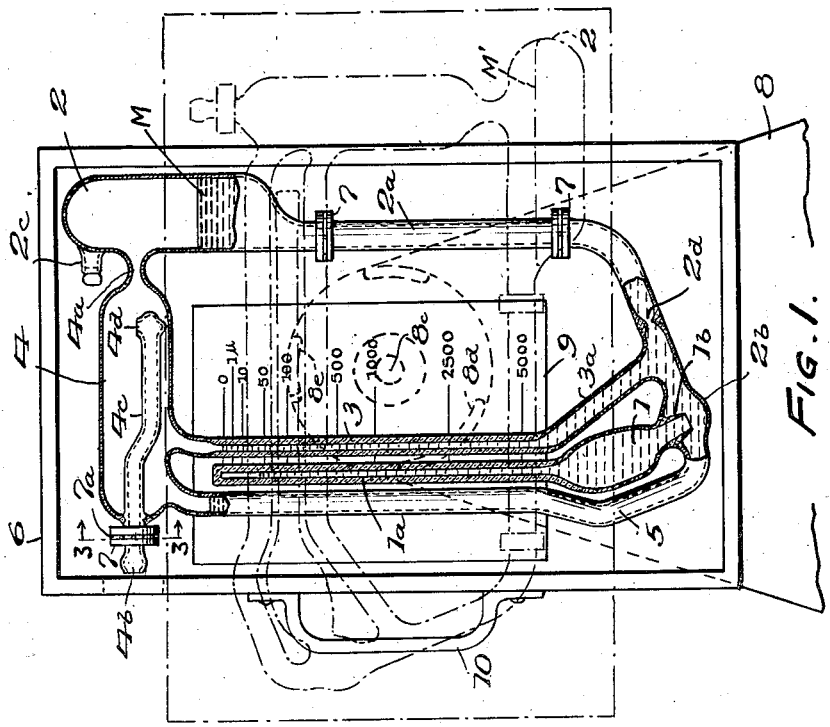
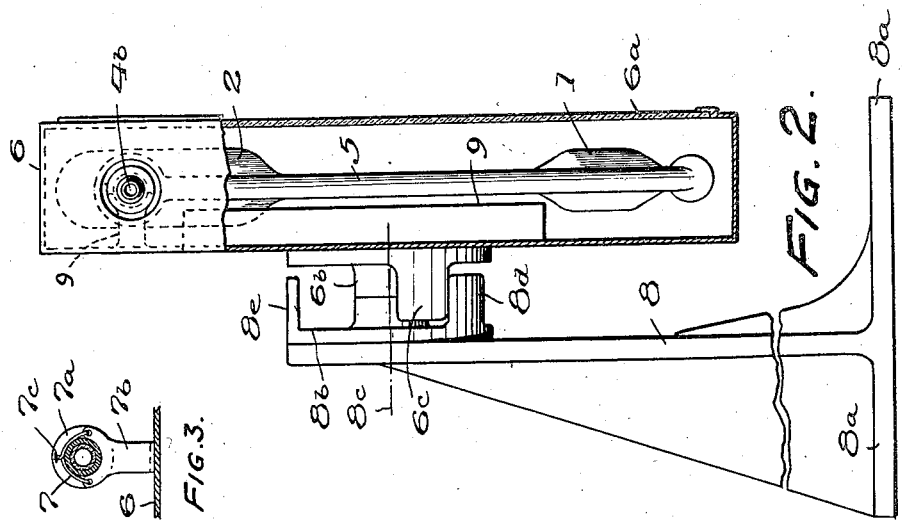
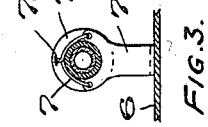
INVENTORS
Earl W. Flosdorf
John C. Coleman
BY Ralph B. Stewart
ATTORNEY.

Patented Mar. 31, 1942

2,278,195

UNITED STATES PATENT OFFICE 2,278,195

VACUUM GAUGE

Earl W. Flosdorf, Upper Darby, and John C. Coleman, Wyndmoor, Pa., assignor to F. J. Stokes Machine Company, a corporation of Pennsylvania Application September 16, 1939, Serial No. 295,286

17 Claims. (Cl. 73—31)

This invention relates to vacuum gauges of the McLeod type for measuring extremely low pressures.

The underlying principle of all McLeod gauges is that a measured volume of highly rarified gas is condensed or compressed to a much smaller volume under the action of a definite pressure, and the volume of the gas when compressed is an indication of the pressure of the rarified gas. In all types of McLeod gauges, a compression chamber or bulb of known volume is provided with a connection from its lower part to the rarified gas to be measured, and is also provided with a capillary tube at its top which is graduated along its length so that the graduations starting from the tip of the capillary tube are in terms of pressure. Provision is made for causing mercury to close off the compression chamber at the lower end and to enter the chamber at a predetermined pressure. As the mercury rises within the compression chamber, it compresses the entrapped gas into the capillary tube, and the mercury will rise in the capillary tube until the pressure of the entrapped gas is sufficient to counter-balance the pressure of the mercury. Various arrangements have been proposed for supplying the mercury to the compression chamber and for eliminating the effects of variation in atmospheric pressure on the gauge.

In one form of the McLeod gauge, mercury is supplied to the compression chamber from a leveling bulb containing mercury which has a connection to the lower end of the compression chamber or bulb through rubber tubing of suitable length, and the mercury may be caused to flow into the compression chamber by raising the leveling bulb above the level of the compression chamber. In this form of gauge, the leveling bulb is open at one end to atmospheric pressure, and it then becomes necessary to provide a column of mercury between the gauge and the leveling bulb of sufficient length to balance the difference between the atmospheric pressure and the pressure within the high vacuum system. This usually requires a column of mercury of the order of 760 mm. (30 inches) and this column is usually provided by a thirty-inch glass tube extension arranged below the gauge and at the lower end of which the leveling bulb is attached by means of rubber tubing. Such construction is extremely bulky, is time-consuming in operation and is not readily moved about from one location to another.

In another form of the McLeod gauge, a hand-operated pump is employed for forcing the mercury into the compression chamber instead of raising or lowering a leveling bulb, but in both of these arrangements, the accuracy of the gauge depends upon the accuracy of the manual manipulation of the leveling bulb or of the pump.

It has also been proposed to have an auxiliary vacuum applied to the leveling bulb instead of atmospheric pressure in order to eliminate the mercury column forming the atmospheric seal, and thereby shorten the tube. In order to make a reading in such a modification the auxiliary vacuum is partially dispelled in order to cause the mercury to enter the compression bulb in the gauge. After the reading is made the auxiliary vacuum must be established again within the leveling bulb. Such modification requires extremely elaborate apparatus including means for producing the auxiliary vacuum, and requires considerable time for making a pressure reading.

In another form of McLeod gauge, the compressing fluid of the gauge is enclosed within a chamber or reservoir entirely sealed from atmospheric pressure, and provision is made for manually varying the volume of the reservoir containing the compressing fluid to cause the fluid to rise within the compression chamber. Such an arrangement has the same objections as the early forms of gauges in that its accuracy depends upon the skill of the manual adjustment of the volume of the reservoir containing compressing fluid and is slow in operation.

In another known modification, the compression chamber and leveling chamber are formed of an integral glass structure mounted to swing back and forth on a ground glass swivel so that the action of gravity will cause the mercury to enter and leave the compression chamber. This modification is subject to many objections of the other known forms of gauges, and, being mounted upon a glass swivel, is extremely fragile. Also, this form of gauge requires a rotation of the gauge through 180 degrees from the reading position to the resetting position.

An object of the present invention is to devise a pressure gauge of the McLeod type which is substantially unaffected by variations in atmospheric pressure, and in which the accuracy of the gauge is not dependent upon any manual adjustment of the gauge or parts thereof.

A further object is to devise a compact form of McLeod gauge which may be easily and readily transported from one location to another and which may be transported in any position without loss of mercury therefrom.

A further object of the invention is to devise a gauge of the McLeod type in which the gauge is mounted upon a pivotal support so arranged that the gauge may be moved from a position where the capillary tube is vertical into a position where the capillary tube is substantially horizontal whereby the mercury flows out of the capillary tube and compression chamber into the reservoir portion of a leveling tube connected to the compression chamber. A further feature of the invention is the pivotal mounting of the gauge on a predetermined axis and the provision of a definite unbalance of the weight of the gauge and its mounting to cause the gauge to move automatically from the vertical position to the horizontal position. A further feature of the mounting arrangement for the gauge is the provision of fixed stop elements to limit the rotation of the gauge to predetermined positions, thus eliminating the necessity for manual adjustment of the apparatus.

Still another feature of the invention is the provision of means for eliminating "hammering" of the mercury as the gauge is moved from one position to another.

Our invention is illustrated in the accompanying drawing, in which:

Figure 1 is a front elevation of our device with parts in vertical cross-section showing the device in operative position and with chain-dotted lines showing the device in position of rest;

Figure 2 is a side elevation of the device shown in Figure 1 with the casing and cover broken away, and Figure 3 is a cross-section on line 3—3 of Figure 1 on an enlarged scale showing the details of the brackets for mounting the gauge.

Referring to the drawing, the gauge of our invention comprises a compression chamber or bulb 1 connected to a leveling bulb or reservoir 2 by a glass tube 2a, the compression bulb 1 being provided with a vertical measuring capillary tube 1a extending upwardly therefrom. As will be seen from Figure 1, the bulb 1 and its capillary 1a forms the left leg of a U-shaped structure of which the leveling bulb 2 and the connecting tube 2a forms the right-hand leg. The lower end of the bulb 1 is provided with a sealing mouth 1b which extends into an enlarged portion 2b of the tube 2a; the function of this construction being described hereinafter. A comparison capillary tube 3 is arranged in parallel relation to the capillary 1a and is connected by the tube 3a to the connecting tube 2a as shown. Capillary 3 is of the same diameter as capillary 1a so that the capillary depression effect will be the same in the two capillaries; otherwise error will be introduced in making pressure readings. The upper end of capillary tube 3 communicates with trap chamber 4 which in turn is connected to the leveling bulb 2 at 4a. A by-pass tube 5 connects the lower end of tube 2a with the trap chamber 4 as shown in Figure 1. By-pass 5 is of larger internal diameter than capillaries 1a and 3, in order to provide more rapid equalization of pressures between the compression chamber and the vacuum space being measured, particularly when some mercury is in tube 2a. This also protects the gauge from damage in case of sudden changes in pressure. The trap chamber 4 is provided with a nipple 4b by which a connection is made from the gauge to the low pressure space to be measured through a suitable rubber tubing attached to the nipple 4b but not shown in the drawing. The mercury M of the gauge may be introduced through the nipple 4b, but in order to prevent the mercury from escaping from the gauge, a trap is provided in the bulb 4 and consists of a tube 4c extending from the nipple 4b inwardly into the bulb 4 and having an opening 4d communicating with the interior of the trap bulb 4 approximately at the center of the chamber 4. The chamber 4 is formed with sufficient volume so that the gauge may be turned in any position and the mercury will not rise above the level of the opening 4d and, therefore, will not escape from the gauge. In order to facilitate removal of the mercury and cleaning of the gauge, the leveling bulb 2 may be provided with a sealed-in plug 2c.

The gauge proper is mounted within a casing 6 by special mounting devices shown at 7 and illustrated in detail in Figure 3. These mounting devices consist of rings 7 of resilient material such as rubber surrounding tubular parts of the gauge and being provided with annular grooves 7a formed in the outer periphery thereof. The rings 7 are supported by fork or yoke members 7b secured to the base of the casing 6 and having the arms of the yoke engaging with the grooves 7a. The rings 7 are secured to the yokes 7b by suitable fastening means such as a wire 7c passing through holes formed in the ends of the arms of the yoke and the ends being twisted together within the grooves 7a as shown in Figure 3. Casing 6 may be provided with a glass or other transparent cover 6a as shown in Figure 2.

Casing 6 is pivotally supported upon a stand 8 having a sufficiently large base or foot 8a to support the gauge on a desk or bench without any further fastening means. The pivotal connection between the casing 6 and the stand 8 comprises a pivotal connection between a metallic member 8b carried by the stand and a metallic member 6b secured to the casing 6, the pivotal connection being on a horizontal axis 8c. A stop 6c on the member 6b is arranged to cooperate with a pair of stops 8d and 8e on member 8b to limit movement of the casing about the axis 8c. Engagement of the stop 8d limits movement of the casing in an anti-clockwise direction as viewed in Figure 1 and maintains the capillary 1a in substantially vertical position, while engagement of the stop 6c with the stop 8e limits movement of the casing in a clock-wise direction and maintains the casing in a position such that the capillary 1a is in substantially a horizontal position at right angles to the reading position. The reading position of the gauge is shown in solid lines in Figure 1 and the resetting position is shown in chain-dotted lines in Figure 1. The leveling bulb 2 preferably is of sufficient volume so that when the gauge is in resetting position all of the mercury is located in the bulb 2, and the approximate level of the mercury is indicated at M'. The axis 8c on which the casing 6 is mounted for rotation is so located that the center of gravity of the gauge and its enclosing housing is located to the right of the axis as viewed in Figure 1, whereby the casing is automatically moved to the resetting position by action of gravity unless it is restrained by some external force. Accordingly, the normal position for the gauge is in the resetting position shown in dotted lines in Figure 1, and the gauge must be moved manually into the reading position shown in solid lines in Figure 1. As will be seen in Figure 1, the lower end of by-pass 5, the chamber 1, and the tube 3a at the lower end of capillary 3 are all arranged at an angle to the vertical axis of the gauge so that the mercury will drain completely out of these elements no matter how quickly the gauge is tilted back to the horizontal or resetting position. Also, the upper ends of by-pass 5 and capillary 3 are curved at the point where they join with trap chamber 4 so as to facilitate return of part of the mercury from these elements to bulb 2 through chamber 4. Casing 6 is provided with a handle 10 for convenience in carrying the gauge about.

As will be understood by those familiar with McLeod gauges, the volume of the compression chamber extending from the mouth 1b and including all of the chamber 1 and the capillary 1a is of known volume, and the volume of the capillary 1a has a definite relation to the total volume of the compression chamber 1 and its capillary. Sufficient mercury is introduced in the leveling bulb 2 so that when the gauge is in the reading position, the level of the mercury within capillary tube 3 will always register with the zero line shown on the scale 9 supported from the base of the casing 6 and located immediately behind capillaries 1a and 3. The diameter of the leveling bulb 2 is sufficiently large with respect to the diameter of capillary 1a so that differences in the pressure being measured, which would cause different amounts of mercury to enter capillary 1a at different times, do not cause any appreciable difference in the level of the mercury in capillary tube 3.

Operation of our gauge is as follows: It will be understood that the gauge is connected by a rubber tubing (not shown) from the nipple 4b to the low pressure space to be measured, and the gauge is normally resting in the resetting position shown in dotted lines in Figure 1. In this position all of the mercury is located in the leveling bulb 2 so that the compression chamber 1 is connected to the low pressure space through either the by-pass 5 or through the tube 2a and through the trap chamber 4. The compression chamber 1, therefore, assumes the same pressure as the space to be measured. Upon manually tilting the gauge into the reading position shown in solid lines in Figure 1, the stop 6c engages the stop 8d and automatically stops the gauge in correct reading position. As the gauge is tilted into this position, mercury flows out of the bulb 2 through the tube 2a and enters the compression chamber 1 through the mouth 1b. The arrangement of mouth 1b on the compression chamber provides a clean "break" in the mercury, that is, it provides a sharp closing off or sealing of the chamber, thus insuring the trapping of the same quantity of air at each operation whereby the accuracy of the gauge is increased. As the mercury closes off or seals the mouth 1b it traps a given quantity of low pressure gas within the compression chamber 1, and as the mercury rises in the chamber 1, it compresses the gas into a small space in the upper end of capillary 1a. The mercury rises in capillary 1a until the pressure of the compressed gas exactly equals the pressure of gravity tending to force mercury from the leveling bulb 2 into the capillary 1a. The level to which the mercury rises in capillary 1a is a function of the pressure in the low pressure space, and, when the various parts of the gauge are properly dimensioned, the scale 9 may be graduated directly to indicate the pressure in microns as shown in Figure 1.

In the reading position of the gauge, the columns of mercury in tubes 2a, 3 and 5 are subject to the pressure to be measured, through chamber 4, and the accuracy of the gauge is not affected by variations in atmospheric pressure.

After a reading is taken, the operator simply releases the casing 6 and the gauge automatically returns to the resetting position. During the return movement, the mercury flows out of the compression chamber 1, out of capillary 3 and out of by-pass tube 5 into the leveling bulb 2. In order to prevent "hammering" of the mercury in flowing from one part of the gauge to another, a constriction 2d is formed in the tube 2a between the bulb 2 and the compression chamber 1 and by-pass 5. This constriction has a diameter of the order of 1 millimeter and prevents rapid flow of the mercury from one side of the gauge to the other and vice versa. The constriction is sufficiently large, however, to permit operation of the gauge to obtain a pressure reading as often as every two or three seconds. The resetting position of the gauge is not critical; it may be greater or less than 90 degrees from the reading position. It is essential, however, that the gauge be tilted from the reading position far enough to completely empty by-pass 5 and compression chamber 1.

The principle of operation of our gauge can be made clearer by observing the fact that the gauge comprises a tubular ring-shaped structure formed of the levelling bulb 2, connection 2a, by-pass 5, and trap chamber 4, these tubular elements being arranged in the general shape of a rectangular ring. The compression bulb 1 with its upwardly extending capillary tube 1a is connected to the tubular ring at a point on the lowermost part thereof, and the vacuum connection to the gauge is made through the trap chamber 4 located at a point on the upper portion of the tubular ring, whereby the ring is divided into two branches between the point of the vacuum connection and the point of connection to the compression chamber. The levelling bulb 2 is situated in one branch of the tubular ring and has sufficient capacity to lower the level of the mercury below the points of connection from the ring to the vacuum and to the compression chamber, when the tubular ring is turned so that the levelling chamber branch is lowermost, thereby emptying the mercury from the opposite branch (by-pass 5) and providing a vacuum connection to the compression chamber.

From the foregoing description, it will be seen that we have devised a very compact and sturdy gauge which is readily portable and which can be easily and quickly operated to obtain frequent pressure indications. In one form of the gauge as manufactured according to our invention for a pressure range of zero to 5000 microns, casing 6 measures only 2 inches by 7 inches by 11 inches and weights only 4½ pounds with the mercury. Less than one pound of mercury is required. Also, the gauge of our invention does not employ rubber tubing connections between the leveling bulb and the compression chamber, and neither does it depend upon manual adjustment of the height of the mercury in capillary 3 or in the leveling bulb. The unbalance of the gauge on its pivotal mounting tending to move it to the resetting position is sufficiently light to permit movement of the gauge to reading position by a relatively light pressure of only one finger. The gauge is mounted in the casing upon resilient mountings and the entire weight of the gauge is carried by the metal pivotal connection, which includes the metal stops. Thus, the construction is very rugged and may be operated quickly without danger of breakage.

While the pivotal mounting of the casing 6 on the stand 8 facilitates turning of the gauge from reading to resetting position quickly, this pivotal mounting is not at all essential to the invention, since it is obvious that the gauge may be used by simply standing the case 6 on its end for reading, and standing the case on its side for resetting.

It will be obvious that variations in detail construction may be made without departing from the principle of our invention. It will be noted that bulb 2 with tube 2a and by-pass 5 form a U-shaped structure to which the compression chamber 1 is joined at the yoke section. The leveling bulb may be located in either leg of the U-shaped structure. Also, the position of comparison capillary 3 may be different from that shown in the drawing; for example, it may be located between compression chamber 1 and by-pass 5, if desired. Also tube "5" could be eliminated in gauges made for those pressure ranges at which capillaries 1a and 3 would be relatively large.

What we claim is:

1. In combination, a vacuum gauge of the McLeod type comprising an integral U-shaped tubular glass structure containing mercury, one leg of which is formed of a compression chamber with a measuring capillary attached thereto and extending upwardly therefrom, and the other leg is formed of a leveling bulb and tube connected to said compression chamber, a casing for said gauge, means mounting said gauge within said casing, a supporting base for said casing, a pivotal connection between said casing and said base for permitting said casing to be rotated about a horizontal axis from a reading position in which the measuring capillary is substantially vertical to a resetting position where the mercury is drained from the compression chamber into the leveling bulb, and a connection to the low pressure to be measured leading to the lower end of said compression chamber.

2. A combination according to claim 1 in which two cooperating stops are provided on the base and on the casing of the gauge to limit rotation of the casing in opposite directions and to maintain the casing respectively in the reading and resetting positions of the gauge.

3. A combination according to claim 1 in which the pivotal connection of the casing is displaced from the center of gravity of the casing and gauge so that the casing normally tends to return to the resetting position of the gauge by the action of gravity.

4. A vacuum gauge of the McLeod type comprising an integral U-shaped tubular construction containing mercury in both legs thereof, a connection from the top of both legs to a vacuum space to be measured, a compression chamber having a connection to the yoke portion of said U-shaped structure and provided with a measuring capillary, said U-shaped tubular construction having a bore substantially larger than the bore of said measuring capillary for permitting rapid equalization of pressure between said compression chamber and said vacuum space and means for mounting said gauge for rotation about a horizontal axis to cause the mercury to flow out of one leg of said U-shaped structure, and out of said compression chamber and capillary, into the opposite leg of said U-shaped structure, said opposite leg having sufficient volume to receive all of the mercury from said one leg and from said compression chamber and capillary.

5. A vacuum gauge according to claim 4 in which a comparison capillary is arranged parallel to the measuring capillary and is connected at its lower end to the yoke of the U-shaped structure and is connected at its upper end to the connection leading to the vacuum space to be measured.

6. A vacuum gauge according to claim 4 in which a fixed stop is provided for cooperation with the mounting of said gauge to limit rotation of said gauge to a reading position, and a second fixed stop is provided for limiting rotation of said mounting in the opposite direction and maintaining the gauge in resetting position.

7. A vacuum gauge according to claim 4 in which a fixed stop is provided for cooperation with the mounting of said gauge to limit rotation of said gauge to a reading position, and a second fixed stop is provided for limiting rotation of said mounting in the opposite direction and maintaining the gauge in resetting position, said mounting including a pivotal axis displaced from the center of said gravity of said gauge in a direction to normally bias said gauge to move into resetting position.

8. A vacuum gauge according to claim 4 in which the upper ends of the legs of the U-shaped structure are joined by a bulb and said vacuum connection includes an inlet tube extending into said bulb and having an opening located approximately at the center of the bulb, said bulb being of sufficient volume so that in any position of the gauge, the opening of said tube will remain above the level of the mercury therein.

9. In a vacuum gauge of the McLeod type, the combination of an integral U-shaped tubular glass structure containing mercury and having a compression chamber formed at the lower end portion of one leg thereof, with a measuring capillary extending vertically upward from the compression chamber and having the upper end thereof closed, a levelling bulb formed at the upper end portion of the other leg of said structure and being connected by said leg to the lower portion of the compression chamber so that when said U-shaped structure is placed in a substantially horizontal position with the leg containing the compression chamber and capillary elevated above the leg containing the levelling bulb, the mercury within said structure will drain into said levelling bulb, said levelling bulb being of sufficient capacity to hold all the mercury within said structure, and its internal diameter being comparatively large with respect to the diameter of the bore of said capillary, whereby different levels of mercury in the capillary will not cause any appreciable difference in level of mercury in the levelling bulb when the gauge is in vertical position, a connection to the low pressure to be measured leading into the levelling bulb above the level of mercury therein in either horizontal or vertical position, a comparison capillary arranged parallel with said measuring capillary and having its lower end connected to the lower portion of said U-shaped structure and its upper end communicating with the low pressure to be measured and a tubular connection having a bore substantially larger than the bores of said measuring and comparison capillaries connected between the compression chamber and the connection to the low pressure to be measured.

10. In a vacuum gauge of the McLeod type, the combination of an integral U-shaped tubular glass structure containing mercury, one leg of said structure being formed as a compression chamber with a measuring capillary attached thereto and extending upwardly therefrom, and the other leg of said structure being formed of a levelling bulb and a tube connected to said compression chamber, means for supporting said U-shaped structure in a reading position in which the measuring capillary is substantially vertical and in a resetting position where the capillary is substantially horizontal and the mercury is drained from the compression chamber into the levelling bulb, a comparison capillary connected to the lower portion of said U-shaped structure and arranged parallel with said measuring capillary, and a connection to the low pressure to be measured leading to the lower end of said compression chamber, said connection having a bore substantially larger than the bore of said measuring capillary and being independent of the tube connecting the levelling bulb with the compression chamber, and the sealing mouth of said compression chamber being located substantially at the bend of said U-shaped structure.

11. A vacuum gauge comprising a tubular ring-shaped structure, a compression chamber having a connection to said tubular ring at a point on the lowermost part thereof, a measuring capillary extending upwardly from said compression chamber, and a vacuum connection to said tubular ring at a point on the upper portion thereof, said tubular ring having a bore substantially larger than the bore of said measuring capillary and having an enlarged portion forming a levelling chamber in one branch thereof, mercury contained within said tubular ring and partly filling said levelling chamber, said levelling chamber branch having sufficient capacity to lower the level of the mercury below said points of connection when said tubular ring is turned so that said levelling chamber branch is lowermost, whereby the opposite branch of said tubular ring provides a vacuum connection to said compression chamber, and a comparison capillary arranged parallel with said measuring capillary and having its lower end connected to the lower portion of said tubular ring and its upper end connected to the upper portion of said tubular ring.

12. In a vacuum gauge of the McLeod type, the combination of a U-shaped tubular structure containing mercury and having a compression chamber formed at the lower end portion of one leg thereof, with a measuring capillary extending vertically upward from the compression chamber and having the upper end thereof closed, a levelling bulb formed at the upper end portion of the other leg of said structure and being connected by said leg to the lower portion of the compression chamber so that when said U-shaped structure is placed in a substantially horizontal position with the leg containing the compression chamber and capillary elevated above the leg containing the levelling bulb, the mercury within said structure will drain into said levelling bulb, a connection to the low pressure space to be measured leading into the levelling bulb above the level of mercury therein in either horizontal or vertical position, and a tubular connection connecting the yoke or bend portion of said U-shaped structure with the space above the mercury level in said levelling bulb, said tubular connection having a bore substantially larger than the bore of said measuring capillary for permitting rapid equalization of pressure between said compression chamber and said low pressure space, said levelling bulb and the connections thereto being of sufficient capacity to lower the level of the mercury within said structure below the point of connection of said tubular passage to said yoke portion when said U-shaped structure is in said horizontal position.

13. A vacuum gauge of the McLeod type comprising a U-shaped tubular structure containing mercury and having a compression chamber formed at the lower end portion of one leg thereof, with a measuring capillary extending vertically upward from the compression chamber and having the upper end thereof closed, a levelling bulb formed at the upper end portion of the other leg of said structure and being connected by a tubular connection to the lower portion of the compression chamber so that when said U-shaped structure is placed in a substantially horizontal position with the leg containing the compression chamber and capillary elevated above the leg containing the levelling bulb, the mercury within said structure will drain into said levelling bulb, a connection to the low pressure to be measured leading into the levelling bulb above the level of mercury therein in either horizontal or vertical position, said levelling bulb being of sufficient capacity and being suitably positioned to drain the mercury entirely out of said compression chamber and below the level of said tubular connection when said structure is in a substantially horizontal position, whereby said tubular connection provides an unobstructed vacuum connection between the compression chamber and the space in the levelling bulb above the level of mercury therein, and means for mounting said U-shaped structure to support the weight thereof independently of said connection to the low pressure, said mounting means embodying means to invariably position the gauge in a position with the capillary vertical or in a position with the capillary substantially horizontal.

14. A vacuum gauge according to claim 13 wherein said means for mounting the U-shaped structure for movement from a reading position where the capillary is substantially vertical to a re-setting position where the capillary is substantially horizontal, includes a rectangular casing and means mounting said U-shaped structure in said casing with the capillary positioned normal to one wall of said casing.

15. A vacuum gauge according to claim 13 and wherein said mounting means includes means for pivotally mounting the U-shaped structure for movement from a reading position where the capillary is substantially vertical to a re-setting position where the capillary is substantially horizontal, said pivotal mounting means having its pivotal axis displaced from the center of gravity of the combined structure in a direction so that said gauge tends to move from the reading to the re-setting position by the action of gravity.

16. A construction for a vacuum gauge comprising, in combination, a tubular ring-shaped structure, a compression chamber having a connection to said tubular ring at a point on the lowermost part thereof, a measuring capillary extending upwardly from said compression chamber, and a vacuum connection to said tubular ring at a point on the upper portion thereof, said tubular ring having a bore substantially larger than the bore of said measuring capillary for permitting rapid equalization of pressure between said compression chamber and said vacuum connection and having an enlarged portion forming a levelling chamber in one branch thereof, means for supporting the aforesaid combined structure in one position where the measuring capillary is substantially vertical and in another position where the measuring capillary is substantially horizontal and said points of connection to said tubular ring are at substantially the same elevation, with the levelling chamber branch of said ring lowermost, said combined structure being so proportioned that the capacity or inner volume of said combined structure below the horizontal plane of the lowermost of said connections, when said capillary is horizontal, is at least equal to the capacity of said combined structure below the horizontal plane passing through the upper end of said capillary when said capillary is in vertical position.

17. A construction for a vacuum gauge of the McLeod type comprising, in combination, a U-shaped tubular structure having a compression chamber formed at the lower end portion of one leg thereof, with a measuring capillary extending vertically upward from the compression chamber and having the upper end thereof closed, a levelling bulb formed at the upper end portion of the other leg of said structure and being connected by a tubular connection to the lower portion of the compression chamber, means for supporting the aforesaid combined structure in one position with the capillary vertical and in another position with the capillary substantially horizontal, with the leg containing the levelling bulb positioned below the capillary, and a connection to the low pressure space to be measured leading into the upper part of the levelling bulb in either horizontal or vertical position, said supporting means embodying means to support the weight of said combined structure independently of said connection to the low pressure space and embodying means to invariably position the gauge in a position with the capillary vertical or in a position with the capillary substantially horizontal said levelling bulb having at least a portion thereof located below the level of said tubular connection when said U-shaped structure is in a horizontal position, said portion having an internal volume at least equal to the internal volume of said combined structure below a horizontal plane containing the upper end of said capillary when said capillary is in a vertical position, whereby said tubular connection provides an unobstructed vacuum connection between the compression chamber and the low pressure space when said combined structure is in horizontal position.

EARL W. FLOSDORF.
JOHN C. COLEMAN.